United States Patent [19]
Koeng et al.

[11] Patent Number: 5,563,717
[45] Date of Patent: Oct. 8, 1996

[54] METHOD AND MEANS FOR CALIBRATION OF PHOTOGRAPHIC MEDIA USING PRE-EXPOSED MINIATURE IMAGES

[75] Inventors: Frederick R. Koeng; Edward J. Giorgianni, both of Rochester, N.Y.

[73] Assignee: Eastman Kodak Company, Rochester, N.Y.

[21] Appl. No.: 383,332

[22] Filed: Feb. 3, 1995

[51] Int. Cl.⁶ .................................................. H04N 1/46
[52] U.S. Cl. ............................ 358/406; 358/504; 358/527
[58] Field of Search ................................... 358/406, 504, 358/518, 527; 355/38, 208; H04N 1/40, 1/46

[56] References Cited

U.S. PATENT DOCUMENTS

| | | | |
|---|---|---|---|
| 3,718,074 | 2/1973 | Davis | 95/1.1 |
| 4,500,919 | 2/1985 | Schreiber | 358/78 |
| 4,666,307 | 5/1987 | Matsumoto et al. | 356/404 |
| 4,670,780 | 6/1987 | McManus et al. | 358/80 |
| 4,845,551 | 7/1989 | Matsumoto | 358/80 |
| 5,060,013 | 10/1991 | Spence | 355/208 |
| 5,157,506 | 10/1992 | Hannah | 358/298 |
| 5,255,083 | 10/1993 | Capitant et al. | 358/527 |
| 5,267,030 | 11/1993 | Giorgianni et al. | |
| 5,309,256 | 5/1994 | Takada et al. | 358/504 |
| 5,313,291 | 5/1994 | Appel et al. | 358/501 |
| 5,335,096 | 8/1994 | Shimazaki | 358/518 |
| 5,345,315 | 9/1994 | Shalit | 358/527 |
| 5,365,353 | 11/1994 | Kraft | 358/518 |
| 5,448,381 | 9/1995 | Bohan et al. | 358/527 |

OTHER PUBLICATIONS

J. C. Dainty and R. Shaw, Image Science, Academic Press NY, 1974 pp. 53–54.
R. W. G. Hunt, The Reproduction of Colour, J. Wiley & Sons, NY, 1975, pp. 224–225, 1987.
*Principles of Color Sensitometry*, Society of Motion Picture and Television Engineers, Mack Printing Company, Easton, PA, (1963), pp. 17–20.
Dainty, J. C. and R. Shaw, *Image Science*, Academic Press, New York, New York (1974), pp. 53–55.
Hunt, R. W. G., *The Reproduction of Colour in Photography, Printing, and Television*, 4th Edition, Fountain Press, Tolworth, England (1987), p. 225.
Nelson, C. N., *Photographic Science And Engineering*, vol. 15, No. 1, Jan.–Feb., 1971, pp. 82–97.
Stone, Maureen, William Cowan, and John Beatty, Color Gamut Mapping and the Printing of Digital Color Images, *Xerox Parc.*, EDL–88–1, Apr., 1988, Palo Alto, California, pp. 1–52.

*Primary Examiner*—Kim Yen Vu
*Attorney, Agent, or Firm*—Edward Dugas

[57] ABSTRACT

A method and associated apparatus for calibrating a photographic media requiring only a minimal area of the media by producing a pattern of exposure patches utilizing the steps of forming an exposure area on a portion of unexposed photographic media as a plurality of abutted test patches wherein the width of all the test patches is substantially constant and the width is less than 100 μm. Each test patch is then exposed at a substantially constant log illumination increment over the previous test patch.

4 Claims, 4 Drawing Sheets

METHOD AND MEANS FOR CALIBRATION OF PHOTOGRAPHIC MEDIA USING PRE-EXPOSED MINIATURE IMAGES

TECHNICAL FIELD OF THE INVENTION

This invention relates generally to color-imaging systems and to color-imaging methods and associated apparatus. More particularly, the invention relates to novel methods and means for providing calibration of photographic media requiring only a minimal area of said media. The methods and means of this invention are especially applicable for calibration of photographic media used in hybrid imaging applications.

CROSS-REFERENCE TO RELATED APPLICATIONS

Reference is hereby made to U.S. Ser. No. 991,889 (now U.S. Pat. No. 5,267,030) entitled "METHODS AND ASSOCIATED APPARATUS FOR FORMING IMAGE DATA METRICS WHICH ACHIEVE MEDIA COMPATIBILITY FOR SUBSEQUENT IMAGING APPLICATIONS" filed Aug. 17, 1992, in the names of E. Giorgianni and T. Madden, and to U.S. patent application Ser. No. 059,060, entitled "METHODS AND ASSOCIATED APPARATUS WHICH ACHIEVE IMAGING DEVICE/MEDIA COMPATIBILITY AND COLOR APPEARANCE MATCHING", filed May 7, 1993, in the names of E. Giorgianni and T. Madden

BACKGROUND OF THE INVENTION

Color imaging systems known in the art permit images to be captured by certain color-imaging media, possibly digitized and stored, and then output onto complementary media. So, for instance, color images may be first captured on negative-working silver-halide-based photographic film and then reproduced on negative-working photographic paper. Such images may or may not pass through a digital intermediary. In another case, color images may be captured on positive-working photographic materials, known as transparencies, and then viewed directly by projection or back-illumination, or copied onto larger or smaller transparencies, or printed onto positive photographic paper. Again, such images may or may not pass through a digital intermediary.

Color-imaging systems in which the image passes through a digital intermediary are often referred to as "hybrid" imaging systems because they combine elements of photographic or other chemical-based imaging together with various elements of electronic imaging systems. Such systems may offer advantages such as convenient image modification, image editing, and image storage.

A hybrid imaging systems must include a method for scanning or for otherwise measuring the individual picture elements of the photographic media, which serve as input to the system, to produce input image-bearing signals. In addition, the system must provide a means for transforming the input image-bearing signals produced by the input scanning device to intermediary image-bearing signals, i.e., to an image representation or encoding that is appropriate for the subsequent applications of the system. Accurate transformation of the input image-bearing signals to and from the encoded image representation requires calibration of the various input and output devices of the system. Techniques for such calibration are well know to those skilled in the art.

For example, U.S. Pat. No. 4,500,919 entitled "COLOR REPRODUCTION SYSTEM" by W. F. Schreiber, discloses an image reproduction system of one type in which an electronic reader scans an original color image and converts it to electronic image-bearing signals. A computer workstation and an interactive operator interface, including a video monitor, permit an operator to edit or alter the image-bearing signals by means of displaying the image on the monitor. When the operator has composed a desired image on the monitor, the workstation causes the output device to produce an inked output corresponding to the displayed image. In that invention, calibration procedures are described for transforming the image-bearing signals to an image representation or encoding so as to reproduce the colorimetry of a scanned image on the monitor and to subsequently reproduce the colorimetry of the monitor image on the inked output.

U.S. patent application Ser. No. 059,060 entitled "METHODS AND ASSOCIATED APPARATUS WHICH ACHIEVE IMAGING DEVICE/MEDIA COMPATIBILITY AND COLOR APPEARANCE MATCHING", by E. Giorgianni and T. Madden describes an imaging system in which image-bearing signals are converted to a different form of image representation or encoding, representing the corresponding colorimetric values that would be required to match, in the viewing conditions of a uniquely defined reference viewing environment, the appearance of the rendered input image as that image would appear if viewed in a specified input viewing environment. The described system allows for input from disparate types of imaging media, such as photographic negatives as well as transmission and reflection positives. In that invention, images are digitally encoded in terms of the color appearance of the image being scanned (or of the rendered color appearance computed from a negative being scanned), and calibration procedures are described so as to reproduce that color appearance on the monitor and on the final output device/medium.

The colorimetric image representation or encoding described by Schreiber is appropriate and desirable for applications where the intent is to represent the colorimetry of an image reproduced directly on, or to be subsequently produced from, a color-imaging medium being scanned into the imaging system. The color-appearance image representation or encoding described by Giorgianni/Madden is appropriate and desirable for applications where the intent is to represent the color appearance of colors as reproduced directly on, or to be subsequently produced from, various color-imaging media scanned for input to the system. In each of these descriptions, the photographic image being scanned is taken to be the original to be reproduced. While calibration is described in each of these systems to allow the appropriate reproduction of the scanned image, neither system provides or requires calibration of the input photographic medium itself, i.e., calibration which would describe the relationship of the scanned image to the original scene or other source of exposure which caused the photographic image to form. Because each system treats the scanned photographic image as the original to match, such input-medium calibration is not required.

It is well known to those skilled in the art, however, that the colors reproduced on, or produced from, a photographic color-imaging medium generally are not colorimetric matches of the actual colors originally photographed by the medium. Colorimetric differences can be caused by the color recording properties of the medium, i.e., its formation of a latent image in response to exposure. Colorimetric errors can also be produced by the color reproduction properties of the medium, i.e., properties related to color image formation subsequent to color image recording. These reproduction properties include the characteristics of the medium's chemical signal processing, such as the relationship between exposure and dye formation within each layer and the chemical relationships among the various layer of the medium. Color reproduction is also influenced by the colorimetric properties of the image-forming dyes of the medium.

In certain hybrid imaging applications, it is not desirable to represent the colors of the image as they appear on, or as they are produced from, the color-imaging medium being scanned into the system. In such applications, it would instead be desirable to form image representations that correspond more closely to the colorimetric values of the colors of the actual original scene that was photographed by the color-imaging medium rather than to image representations that correspond to the reproductions of those colors by the medium itself. Examples of such applications include, but are not limited to, the production of medical and other technical images, product catalogues, magazine advertisements, art-work reproductions, and other applications where it is desirable to obtain color information which is a colorimetrically accurate record of the colors of the original scene. In these applications, the alterations in the color reproduction of the original scene colors by the color recording and color reproduction properties of the imaging medium are undesirable, and the previously described image representations of the prior art are, therefore, also undesirable.

A hybrid imaging system can provide the capability to produce image representations or encodings that represent original scene colorimetric information. A system employing this type of image representation or encoding could be used to form and store a colorimetrically accurate record of the original scene and/or used to produce colorimetrically accurate or otherwise appropriately rendered color images on output devices/media.

In order for an imaging system to accurately represents original scene colorimetric information, its image representation or encoding must not include color alterations produced by the color reproduction properties of the imaging medium. U.S. Pat. No. 5,267,030 entitled, "METHODS AND ASSOCIATED APPARATUS FOR FORMING IMAGE DATA METRICS WHICH ACHIEVE MEDIA COMPATIBILITY FOR SUBSEQUENT IMAGING APPLICATIONS", by E. Giorgianni and T. Madden, provides a method for deriving, from a scanned image, recorded color information which is free of color alterations produced by the color reproduction properties of the imaging medium. In that patent, a system is described in which the effects of media-specific signal processing are computationally removed, as far as possible, from each input medium used by the system. In addition, the chromatic interdependencies introduced by the secondary absorptions of the image-forming dyes, as measured by the responsivities of the scanning device, are also computationally removed. Consistent with the input media compatibility objectives of that invention, each input image is transformed to an image representation or encoding corresponding to the exposures recorded from the original scene, or other source of exposure, which caused the image to form on the input imaging-recording medium.

In that invention, the extraction of recorded exposure information from each input medium allows for input from disparate types of imaging media, such as conventional photographic negatives and transmission and reflection positives. That same process of extracting recorded exposure information can also be use to effectively eliminate any contribution to color inaccuracy caused by chemical signal processing and by the image-forming dyes.

However, the elimination of color inaccuracies caused by chemical signal processing requires a foreknowledge of such processing, i.e., a knowledge of the relationship between the latent image exposure recorded by the medium and the amounts of the image-forming dyes, or the resulting optical densities, that are produced from that exposure. Those skilled in the art will recognize that the density vs. exposure relationship is subject to variability that may be caused by variations in the manufacturing of the photographic medium, by changes that occur after the manufacturing of the photographic medium, by variations in the photographic development and other chemical processing of the medium, and possibly by other factors.

It is well known to those skilled in the art that the density vs. exposure relationship for a chemically processed photographic medium can be determined using appropriate calibration procedures. The basic procedure begins with the exposure of a test sample of the photographic medium to a pattern of known exposures. After the film is exposed to a pattern, the medium is chemically processed, and the resulting optical densities are measured and related to their corresponding exposures. There are two types of patterns generally used; a) a continuous wedge that generates exposures from a relatively high exposure value to no exposure in a continuously varying fashion, and b) an array of spatial patches with stepped exposures of known increments of increasing or decreasing exposure going from one end of the array to the other. The stepped alternative (b) is preferred in the trade and is used in this document since this type of pattern has positional indicators at each step rather than only one at the end of the continuously varying pattern as in alternative (a).

In some applications, it would be desirable to include a calibration exposure pattern on the actual photographic medium that is to be used for recording images, rather than on a separate test sample of that medium. It may also be desirable to locate the pattern of exposure as close as possible to the image area. For example, in U.S. Pat. No. 3,718,074, Davis describes a camera that includes apparatus for exposing patterns of exposures on a photographic medium at the time of scene exposure. The patterns of exposures may be produced using the ambient light source or a calibrated light source included in the camera.

In the Davis patent, exposure patterns comprised of five spatially separated areas of exposure are used. However, it is well known that a precise determination of the density vs. exposure relationship requires that the pattern of exposure be comprised of a greater number of exposure levels. For example, a series of twenty or more exposure levels is typically used for calibrating a photographic medium having a highly nonlinear density vs. exposure relationship.

The use of exposure patterns comprised of a relatively large number of exposure levels may require the use of a considerable area of the photographic medium. The total exposed area can, of course, be minimized if each area of exposure is small. However, it is well known to those skilled in the art that edge density artifacts, such as chemical adjacency effects, can alter the density vs. exposure relationship of small areas of exposure. For example, Dainty and Shaw in Image Science, Academic Press, 1974, pp 53–55, state that densities change not only as a function of exposure but also as a function of exposure area in areas smaller than 1.0 mm square. As a result, a density vs. exposure calibration determined from patterns of exposures where each individual area in the pattern is small may not be representative of the actual density vs. exposure relationship for the medium.

Relatively large areas of exposure are therefore traditionally used for the calibration of photographic media in order to avoid the misleading results that can be produced by chemical adjacency effects. In conventional test exposures, each exposure area is typically 1 cm in width and at least 1 cm in length.

An exposure pattern consisting of a relatively large number of exposure areas in which each exposure area is greater than 1.0 mm square may be too large for many practical applications. For example, the total area would be too large to include within the normally unused area of a frame of standard 35 mm film.

SUMMARY OF THE INVENTION

The preferred method of the invention is a method for producing a pattern of exposure patches for calibrating photographic media, comprising the steps of:

a. forming an exposure area on a portion of unexposed photographic media said exposure area formed of a plurality of abutted image patches wherein the width of all test patches is substantially constant and each is less than 100 µm in width; and b. exposing each test patch at a substantially constant log illumination increment over the previous patch.

In view of the foregoing, an object of the present invention is to provide a novel method and means for calibration of photographic media used in color-imaging systems such that information regarding the scene photographed (by the media being calibrated) can be obtained.

A further object of the present invention is to provide novel methods and means for calibrating photographic media using a minimal area of said media.

To provide these objects, the present invention describes novel calibration methods and means for exposing photographic media which, while using exposure patterns of minimal area, nevertheless provides a representative determination of the actual density vs. exposure relationship for the medium. The calibration method includes exposing, on a photographic medium, a pattern of exposures containing multiple abutted patches of ever increasing, substantially equal stepped log-exposure increments, on the medium at any time before chemical processing.

The summary criteria for appropriately configured patterns of exposures for calibrating photographic media, consistent with the objects of the present invention is as follows:

1) the pattern must include at least five areas of exposures;
2) the areas of exposure must be abutted;
3) the areas of exposure must be substantially equal in width;
4) the widths of the individual exposure areas preferably should be less than 100 µm in width, so as to minimize the total exposure area; and
5) each area of exposure must be exposed at a substantially constant log illumination increment over the previous area.

A procedure for specifying and forming patterns of exposures for calibrating a photographic medium, consistent with the above criteria and the objects of the present invention incorporates the following steps:

1) specifying a range of exposures to adequately cover the range of exposure of said medium;
2) specifying a log exposure increment to adequately sample the exposure range specified in step
3) determining the number of areas to be exposed, based on the exposure range and log exposure increment of steps 1 and 2;
4) determining the exposure for each area to be exposed;
5) selecting an appropriate location to be exposed on the photographic medium; and
6) exposing the selected location of the medium with the exposures of step 4, arranged in an appropriate pattern consistent with the above summary criteria, using an appropriate exposure-producing device.

After the photographic medium has been exposed to an appropriately configured pattern of exposures, the medium is chemically processed and the densities produced in said area of exposure are measured using any of the appropriate microdensitometric devices known in the art.

These and other objects of the present invention will become more apparent when taken in conjunction with the following drawings and the teachings offered in the detailed description of the invention.

DETAILED DESCRIPTION OF THE INVENTION

The advantage of using the particular configurations of exposures of this invention will now be discussed. C. N. Nelson published work in 1971 for calculating the one-dimensional density profile in photographic media where edge density artifacts are present. In the case of long narrow lines (5 mm≦long≦10 mm; narrow≦0.1 mm), the density profile in the narrow dimension is given by equation (1):

$$D_c(x) = D(x) + BD^2(x) - D(x) \int_{-\infty}^{\infty} \Phi(\xi)D(x-\xi)d\xi \quad (1)$$

where $D_c(x)$=density with edge density artifacts $D(x)$=density with no dege density artifacts $\phi(\xi)$=chemical spread function  (2)

$$B = \int_{-\infty}^{\infty} \phi(\xi)d\xi$$

In this equation, D(x) is the density of interest; it is the density that would be obtained by measuring the center of patches larger than 1 mm square. In patches 1 mm or wider, the term containing the integral, and $BD^2(x)$ are equal due to the nature of the chemical spread function. However, as the lines become narrow, this equality fails and the density at the center of a line increases, i.e., the edge density artifact interferes with the measurement of $D(x)$. This analysis shows that the exposure area of a test pattern must be wide, i.e., at least 1 mm, so that the measured density is not confounded by edge density artifacts.

Now consider what happens when these lines are infinitesimally narrow and, in addition, abutted to one another as is the case in a multiple stepped pattern of exposure areas. First assume that one has a straight line density vs. log exposure curve. Further, assume an exposure to this medium that increases linearly with distance, that is, a linear step wedge, or logE scale. This spatial density function is given by equation (3).

$$D(x)=mx+b \quad (3)$$

This is an assumed straight line density function where m is the rate of change of density versus distance, x, and b is a spatial intercept. Substituting equation (3) into equation (1), and starting with the integral gives:

$$\int_{-\infty}^{\infty} \phi(\xi) D(x-\xi) d\xi = \quad (4)$$

$$\int_{-\infty}^{\infty} \phi(\xi)[m(x-\xi)+b] d\xi =$$

$$\int_{-\infty}^{\infty} \phi(\xi) mx\, d\xi + \int_{-\infty}^{\infty} b\phi(\xi) d\xi - \int_{-\infty}^{\infty} \phi(\xi) m\xi\, d\xi =$$

$$(mx+b) \int_{-\infty}^{\infty} \phi(\xi) d\xi - m \int_{-\infty}^{\infty} \xi\phi(\xi) d\xi =$$

$$BD(x) - m \int_{-\infty}^{\infty} \xi\phi(\xi) d\xi$$

If a chemical spread function (x) that is an even function (symmetrical about 0 and goes to 0 at finite absolute values of x) is assumed, then the remaining integral is the product of an even function and an odd function (x), and is equal to zero. The following can therefore be concluded:

$$D_c(x) = D(x) + BD^2(x) - D(x)[BD(x)] \quad (5)$$
$$= D(x)$$

or that $D_c(x)$ is the same as the density without edge density artifacts.

Figure 2:
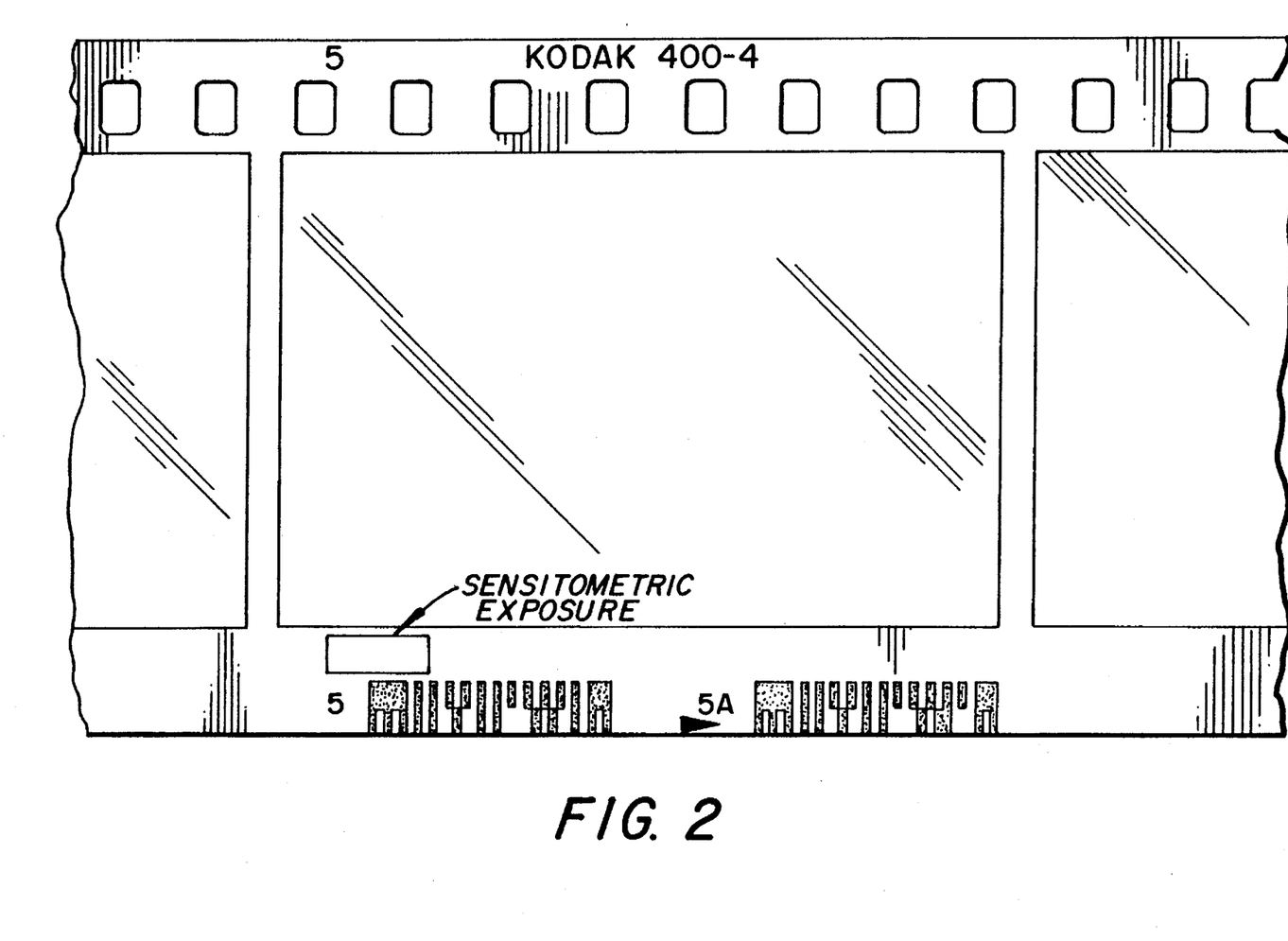
FIG. 2 is a diagram, in accordance with a preferred embodiment of the invention, showing the placement and relative size of a 21-step exposure on a 35 mm film frame.
Figure 3:
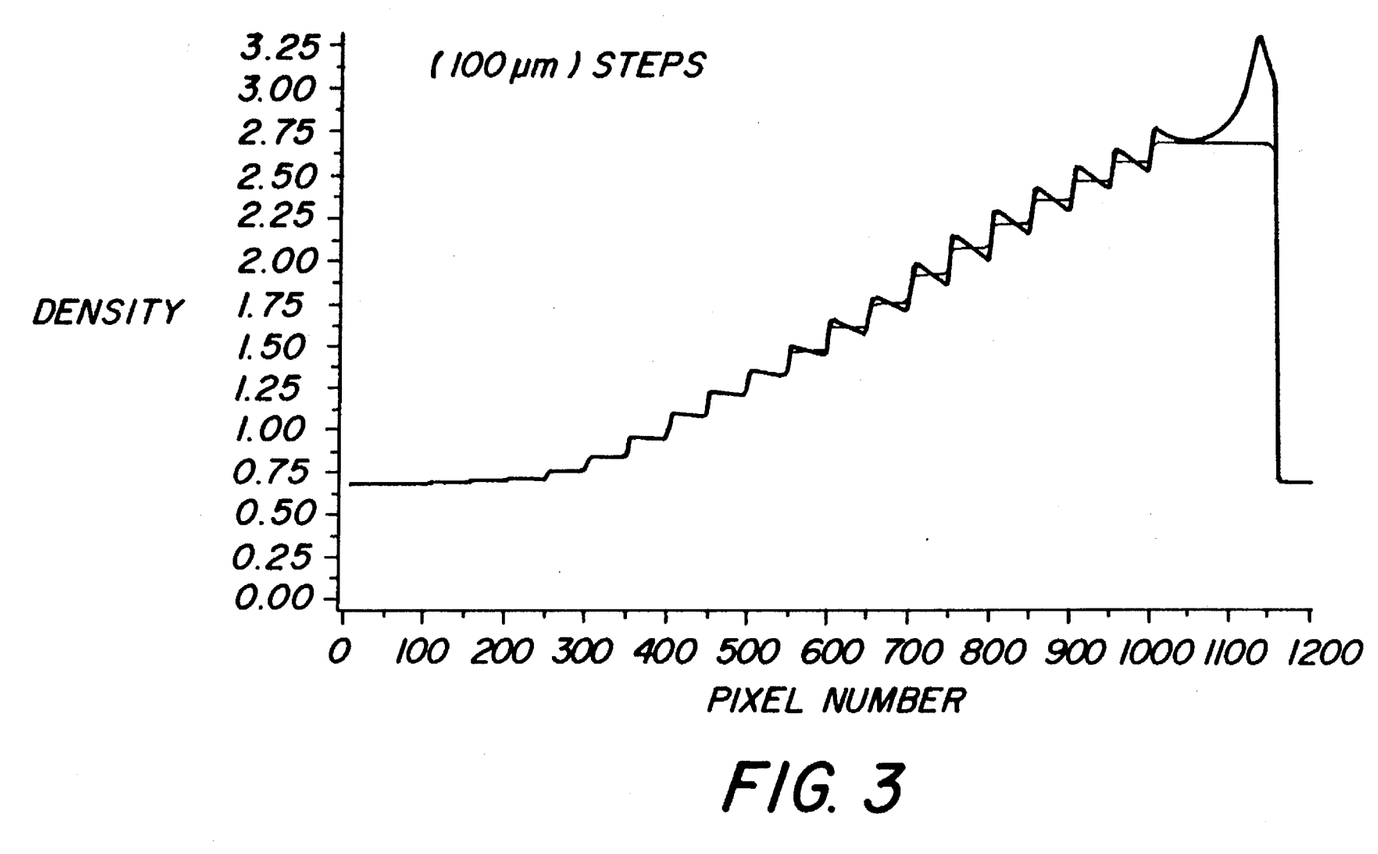
FIG. 3 is a chart illustrating the result of a calculation showing the difference in microdensitometry traces between hypothetical films with and without a density artifact.

A computer program was written to test various spatial patterns of exposures consistent with the above derivation. One configuration tested was a sequence of abutted areas of exposure with long (>5 mm) narrow (100 μm) equal increment log exposure steps. Referring to FIG. 2, 100 μm wide steps, adjacent to one another, and incremented 0.2 logE were tested. It is clear in this simulation that at the mid-point of each step, the densities with (dashed line), and without (solid line), the effects that produce edge density artifacts are identical.

The derivation and the simulation demonstrate that an appropriately configured patterns of exposures will give the expected densities, $D(x)$, without significant deviations due to the edge density artifact. The chemical spread function of photographic media known in the art meet the symmetry and fall-off criteria assumed in this test.

To demonstrate the method and means of this invention, a novel pattern of exposures was specified and formed according to the criteria described in the summary of the invention. The novel exposure pattern contained eighteen abutted steps. Each step was approximately 80 μm wide. A sample of photographic medium was exposed this pattern.

Figure 4:
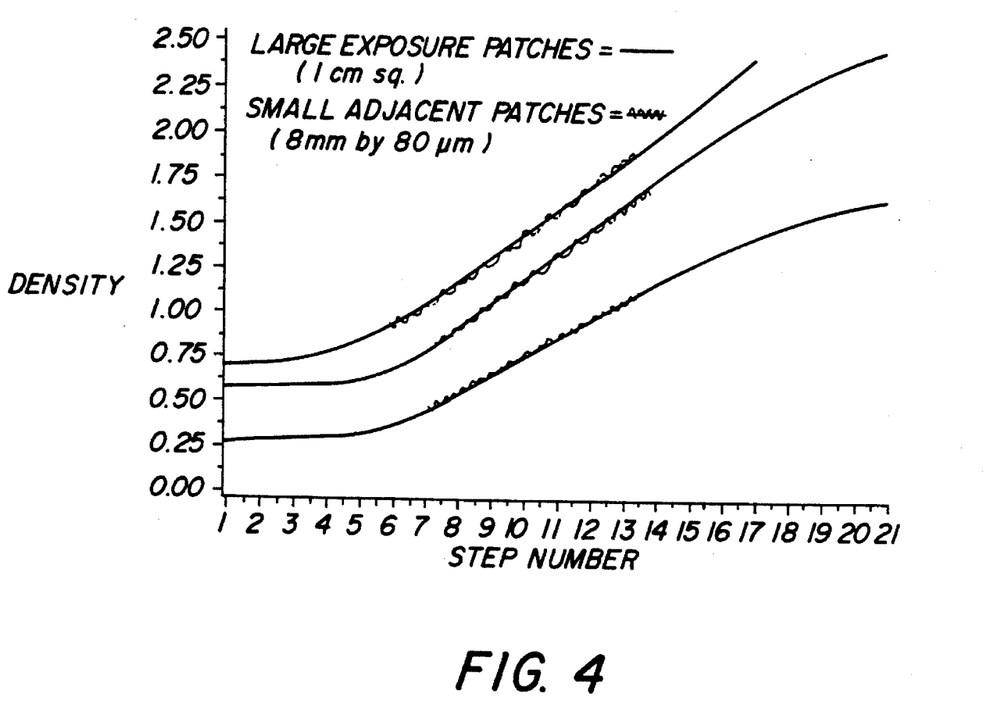
FIG. 4 is a comparison of densitometry for a film using 1 cm² exposures and 8.0 mm×80 µm patches.

After exposure, the photographic medium was chemically processed, and the resulting densities on the medium were measured using a Perkin-Elmer microdensitometer with a 5.4 μm by 200 μm slit at 2 μm intervals along the length of the pattern of exposures. The measurement process produced 40 replicate measurements of each of the small narrow steps. The densitometry from this novel pattern of exposures was compared to that obtained from a conventional pattern of exposures in which each step was 1 cm square. As shown in FIG. 4, the densitometry resulting from the two patterns was substantially equal. The mean differences between the densities measured from the novel and conventional patterns of exposure were red=±0.0093, green=±0.0139, and blue=±0.0165 (number of data points= 708)

To demonstrate the use the invention for exposing a calibration pattern on a 35 mm photographic film, an exposure pattern comprised of 50 steps was exposed. The total area required for this exposure was only 5 mm by 2 mm. The steps were exposed in an area of the medium that was not previously exposed and that would not receive any additional exposure subsequent to the exposure of the pattern. FIG. 2 illustrates the placement of the exposure pattern.

Figure 1:
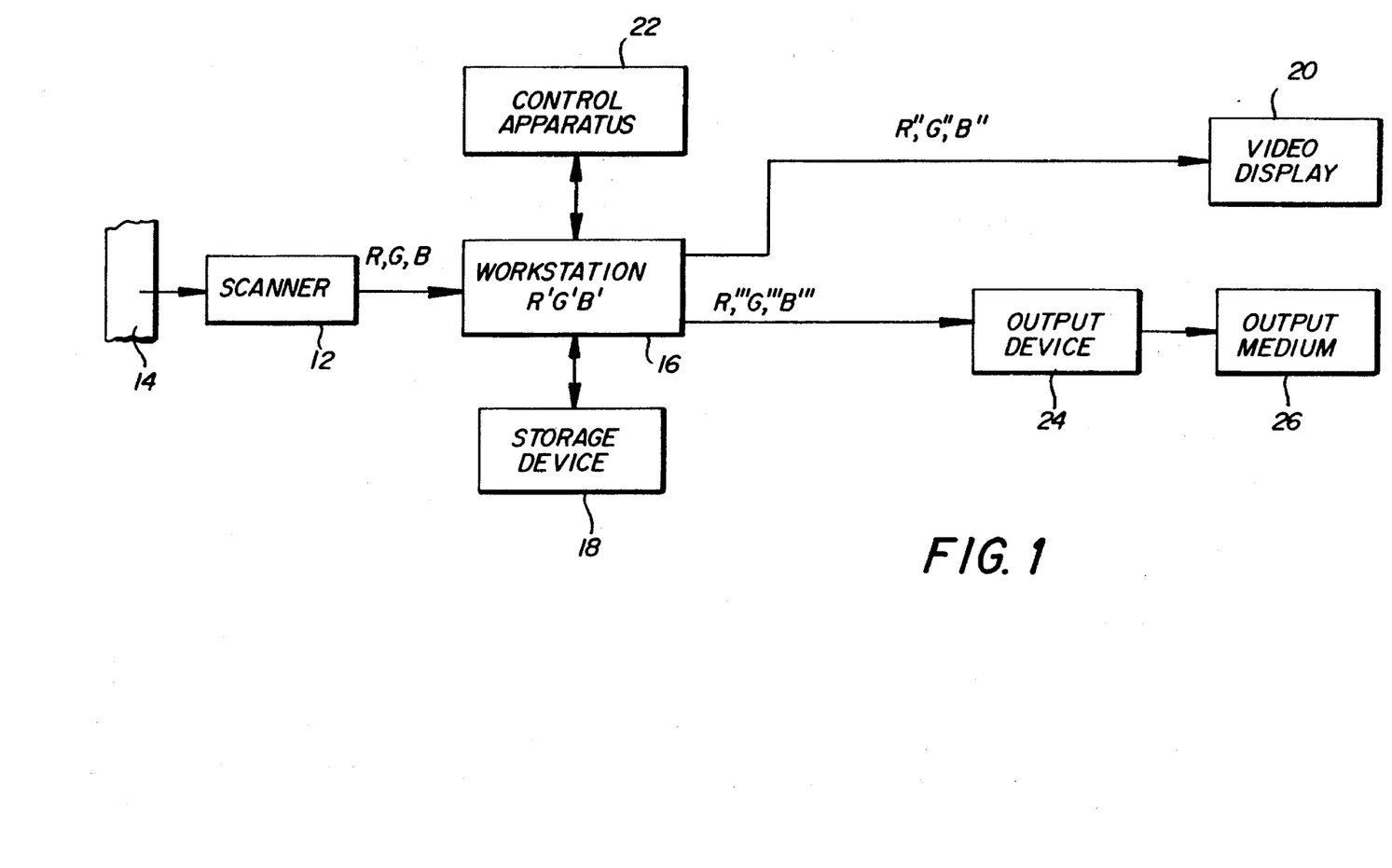
FIG. 1 is a block diagram of a color imaging system in accordance with a preferred embodiment of the invention.

When the methods and means of this invention are used together with a method and means for extracting recorded exposure information from scanned photographic media, a more accurate extraction of recorded exposure information is obtained. For example, when combined with the method and means of U.S. Pat. No. 5,267,030 a more accurate determination of either colorimetric or exposure values can be obtained. Shown in FIG. 1 is a diagram of a hybrid system from U.S. Pat. No. 5,267,030. An image scanner 12, serves for scanning an image on positive or negative photographic film 14, and for producing R, G, B (red, green, and blue) image-bearing signals for each picture element of the image being scanned. A computer-based workstation 16, which receives the image-bearing signals from the scanner transforms the input image-bearing signals into intermediary image-bearing signals R', G', B'. The workstation allows for archival storage of the intermediary image-bearing signals using any of a variety of archival storage writing devices 18, and media such as magnetic tape or disk, or optical disk. The workstation enables an operator to view and edit the image. For that purpose, a video monitor 20, serves to display an image corresponding to an R", G", B" image-bearing signal provided by the workstation. Control apparatus 22, which may include a keyboard and cursor, enables the operator to provide image manipulation commands pertinent to modifying the video image displayed and the reproduced image to be made or stored. An output device 24, which may be a film writer, thermal, ink-jet, electrostatic, or other type of printer, or electronic output device may also be present to receive R''', G''', B''' image-bearing signals from the workstation for output onto the appropriate color-imaging medium, 26.

When said signal-processing methods and means are used to transform image-bearing signals derived from a photographic medium incorporating the calibration method of the present invention, the resulting intermediary image-bearing signals or encoded values are an accurate representation of the exposures of the original scene, or other source of exposure, which caused the medium to be exposed. The intermediary image-bearing signals or encoded values may then be used to store an accurate exposure record of the original scene and/or used to form appropriately rendered images on any of a number of different output devices and media.

One method for performing the mathematical operations required to transform R, G, B image-bearing signals to the intermediary image-bearing signals of the preferred embodiment in U.S. Pat. No. 5,267,030 is as follows:

1) the R, G, B image-bearing signals, which correspond to the measured transmittances of the input medium, are converted to RGB densities by using appropriate 1-dimensional look-up-tables (LUTs), 2) the RGB densities of step 1 are adjusted, by using a matrix or a 3-dimensional LUT, to correct for differences among scanners in systems where multiple input scanners are used, 3) the RGB densities of step 2 are adjusted, by using another matrix operation or 3-dimensional LUT, to remove the interdependence of the image-bearing signals produced by the unwanted absorptions of the imaging dyes and/or by inter-layer chemical interactions in the input medium, and 4) the RGB densities of step 3 are individually transformed through appropriate 1-dimensional LUTs, derived such that the neutral scale densities of the input medium are transformed to the neutral scale exposures of that medium, to produce the linear exposure values that were recorded by the input medium.

5) the exposure values of step 4 may be further transformed by another matrix, a 3-dimensional LUT, or any other similar operation to arrive at exposure values that correspond to colorimetric values, such as CIE XYZ tristimulus values.

The accurate transformation of neutral scale densities of the input medium to the neutral scale exposures of that medium (Step 4) requires an accurate knowledge of the density to exposure relationships. The relationships could be determined for a sample of the photographic medium, which would be exposed and processed using a representative chemical process. As described previously, however, these relationships may be altered by numerous factors such as manufacturing and chemical processing variability. As a result, the density to exposure relationship for the actual medium being scanned may not correspond to that assumed for the sampled medium and process. The calibration process described in the present invention provides an accurate measurement of the density to exposure relationship for each sample of a photographic medium, rather than assuming a density to exposure relationship based on some other sample or other sample/process in which a calibration exposure pattern has been exposed and chemically processed prior to the picture taking process.

One example of a preferred embodiment has been shown, however many variations are possible. Other embodiments of the use of the described appropriately configured patterns of exposure include a) an apparatus included in a camera that would expose the photographic medium during the picture exposure process, and/or b) an apparatus included in the photographic media chemical process workstations that exposes the media just prior to the chemical process. In these potential applications, sufficient area remains in the lower edge of the medium illustrated in FIG. 1 for these exposures. One, two, or all of these exposures could be included in the calibration process.

This invention has been described in detail with reference to the figures and tables; however, it will be appreciated that variations and modifications are possible within the spirit and scope of the invention.

For example, although the invention has been described in terms of a silver-halide based photographic medium, a similar approach can be used for other forms of photographic and non-photographic image-capturing media. Also, the media calibrated according to the preferred embodiment formed conventional image dyes in a standard manner, i.e., the red, green, and blue-sensitive layers formed cyan, magenta, and yellow image dyes, respectively. Other arrangements are also possible, and media using entirely different types of image-forming dyes may be used as long as the scanning operation can detect image signals corresponding to the image-recording layers. Black-and-white media, that form silver images, may also be used.

The medium used in the preferred embodiment described here forms a negative color image upon development and dye formation of the exposed medium through a color negative chemical process, but the method and means of this invention would apply equally well to media capable of producing positive images.

The exposure patterns of the invention have been described as increasing in substantially equal logarithmic exposure increments. These substantially equal logarithmic increments would include increments that are adjusted so as to produce substantially equal increments in optical density on the exposed medium. The use of such adjusted exposure increments would be particularly advantageous for use with photographic media having complex density vs. log exposure relationships.

One method for transforming image-bearing signals from a scanner to signals, which include the recorded exposure values of the image-capturing media has been described. The transformation is comprised of a specific series of discrete operations. Other transformation methods may also be used, as long as the appropriately configured patterns of exposure (calibrated neutral scale) of this invention is included in the transformation.

Applications have been described wherein image-bearing signals from a scanner are transformed to signals which include the recorded exposure values of the image-capturing medium. In other applications, image-bearing signals from a scanner may be transformed to other types of signals or data. For example, image-bearing signals may be transformed to photometric or colorimetric values for the scanned medium. The method and means of the invention can be applied in such applications to correct photometric or colorimetric values. Appropriate correction transforms can be formed based the relationship of photometric or colorimetric values obtained from patterns of exposures produced according to the teachings of this invention, relative to reference photometric or colorimetric values for the medium for the same exposures.

We claim:

1. A method for producing a pattern of exposure test patches for calibrating photographic media, comprising the steps of:

a. forming an exposure area on a portion of unexposed photographic media said exposure area formed of a plurality of abutted test patches wherein the width of all test patches is substantially constant and each is less than 100 µm in width; and b. exposing each test patch at a substantially constant log illumination increment over the previous test patch.

2. A photographic media having an exposure area on an unexposed portion of the media said exposure area formed of a plurality of abutted test patches wherein the width of all test patches is substantially constant and each is less than 100 μm in width, and additionally, wherein each test patch is exposed at a substantially constant log illumination increment over the previous test patch.

3. A means for producing a pattern of exposure patches on a photographic media for calibrating the media, comprising:

means responsive to a specified range of exposures to adequately cover the range of exposure of said photographic media for specifying log exposure increments to adequately sample the exposure range specified; and means responsive to a determining number of patches to be exposed, on said photographic media, based on the specified range of exposure and the specified log exposure increments for exposing each area in a predetermined pattern wherein each patch is substantially constant in width and less than 100 μm in width.

4. A method for producing a pattern of exposure test patches for calibrating photographic media, comprising the steps of:

a. selecting an exposure area on a portion of unexposed photographic media said exposure area to be formed of a plurality of abutted test patches wherein the width of all test patches is substantially constant and each is less than 100 μm in width;

b) specifying a range of exposures to adequately cover the range of exposure of said photographic media;

c) specifying a log exposure increment to adequately sample the exposure range specified in step b);

d) determining the number of areas to be exposed on said photographic media, based on the exposure range and log exposure increment of steps b) and c);

e) determining the exposure for each area to be exposed; and f) exposing the selected exposure area of the unexposed photographic media with the exposures determined in step e) to form the plurality of abutted test patches.

\* \* \* \* \*